US011019463B2

(12) United States Patent
Deng et al.

(10) Patent No.: US 11,019,463 B2
(45) Date of Patent: May 25, 2021

(54) COMMUNICATION METHOD AND COMMUNICATIONS APPARATUS

(71) Applicant: Huawei Technologies Co., Ltd., Shenzhen (CN)

(72) Inventors: Qiang Deng, Shenzhen (CN); Runze Zhou, Shanghai (CN); Yanmei Yang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 56 days.

(21) Appl. No.: 16/423,604

(22) Filed: May 28, 2019

(65) Prior Publication Data
US 2019/0281419 A1    Sep. 12, 2019

Related U.S. Application Data

(63) Continuation of application No. PCT/CN2016/107649, filed on Nov. 29, 2016.

(51) Int. Cl.
*H04W 72/00* (2009.01)
*H04W 88/16* (2009.01)
(Continued)

(52) U.S. Cl.
CPC ............. *H04W 4/06* (2013.01); *H04L 12/18* (2013.01); *H04L 12/189* (2013.01); *H04L 29/06* (2013.01);
(Continued)

(58) Field of Classification Search
CPC ....... H04W 76/10; H04W 72/04; H04W 8/02; H04W 12/0013; H04L 63/1425; H04L 43/062
See application file for complete search history.

(56) References Cited

U.S. PATENT DOCUMENTS

2009/0252133 A1    10/2009  Watanabge et al.
2013/0121298 A1     5/2013  Rune et al.
(Continued)

FOREIGN PATENT DOCUMENTS

CN    101296404 A    10/2008
CN    101304550 A    11/2008
(Continued)

OTHER PUBLICATIONS

3rd Generation Partnership Project; Technical Specification Group Services and System Aspects; Study on architecture enhancements for LTE support of V2X services (Release 14), 3GPP TR 23/85 V14.0.0 (Sep. 2016), 52 pages.

*Primary Examiner* — Iqbal Zaidi
(74) *Attorney, Agent, or Firm* — Slater Matsil, LLP

(57) ABSTRACT

A communication method and a communications apparatus are disclosed. The method is performed by a control plane function entity and includes: obtaining a correspondence between address information of a user plane function entity and a user plane capability supported by the user plane function entity; receiving a request message from an application server, where the request message is used to request to establish a session for a first service and includes service information of the first service, and the service information includes at least one of broadcast area information and service type information; determining address information of a target user plane function entity based on the correspondence and the service information; and establishing a session connection to the target user plane function entity based on the address information.

16 Claims, 6 Drawing Sheets

(51) Int. Cl.
    *H04W 76/40*     (2018.01)
    *H04L 29/06*     (2006.01)
    *H04W 4/40*     (2018.01)
    *H04W 4/06*     (2009.01)
    *H04W 76/11*     (2018.01)
    *H04W 76/45*     (2018.01)
    *H04L 12/18*     (2006.01)

(52) U.S. Cl.
    CPC .......... *H04W 72/005* (2013.01); *H04W 76/11* (2018.02); *H04W 76/40* (2018.02); *H04W 76/45* (2018.02); *H04W 88/16* (2013.01); *H04W 4/40* (2018.02)

(56) References Cited

U.S. PATENT DOCUMENTS

| | | |
|---|---|---|
| 2016/0174198 A1 | 6/2016 | Akiyoshi et al. |
| 2017/0156086 A1* | 6/2017 | Tomici .............. H04W 36/0022 |
| 2017/0188333 A1 | 6/2017 | Wu et al. |
| 2018/0077001 A1* | 3/2018 | Noldus ............. H04L 29/06278 |
| 2018/0359642 A1* | 12/2018 | Torvinen ............... H04L 63/123 |

FOREIGN PATENT DOCUMENTS

| | | |
|---|---|---|
| CN | 102523570 A | 6/2012 |
| CN | 103458438 A | 12/2013 |
| CN | 103636283 A | 3/2014 |
| CN | 105163285 A | 12/2015 |
| CN | 105393506 A | 3/2016 |
| CN | 105516115 A | 4/2016 |
| CN | 105828315 A | 8/2016 |
| WO | 2014000286 A1 | 1/2014 |
| WO | 2016041135 A1 | 3/2016 |

\* cited by examiner

COMMUNICATION METHOD AND COMMUNICATIONS APPARATUS

CROSS-REFERENCE TO RELATED APPLICATIONS

This application is a continuation of International Application No. PCT/CN2016/107649, filed on Nov. 29, 2016, the disclosure of which is hereby incorporated by reference in its entirety.

TECHNICAL FIELD

This application relates to the field of wireless communications, and in particular, to a communication method and a communications apparatus.

BACKGROUND

Internet of Vehicles communications are a hot trend in development of communications technologies, for the purpose of researching and standardizing V2X (Vehicle to Everything) technologies based on LTE (Long Term Evolution). As shown in FIG. 1, an application scenario of a V2X service includes V2V (vehicle to vehicle) communications, V2I (vehicle to infrastructure) communications, and V2P (vehicle to pedestrian) communications. The V2X service is mainly implemented by broadcasting a V2X message.

In a current system, an MBMS (multimedia broadcast multicast system) architecture with separation between a CP (control plane) function and a UP (user plane) function is proposed in an LTE system, and as shown in FIG. 2, includes a BM-SC (broadcast multicast service center), an MBMS-GW (multimedia broadcast multicast system gateway), and an LME (local broadcast entity). A control plane function entity is configured in the BM-SC and the MBMS-GW, and a user plane function entity is configured in the LME. In addition, the user plane function is close to a base station, control plane functions of the BM-SC and the MBMS-GW are retained on a control plane function entity in a core network, and the user plane function entity and the control plane function entity are connected and interact with each other through a newly defined Mv interface.

In the foregoing architecture with separation between the user plane function and the control plane function, the control plane function entity establishes a session connection to a particular user plane function entity in a preconfigured manner. The particular user plane function entity may have a coverage area or service limitation. As a result, a service requirement of an application server fails to be met, and service quality is affected.

SUMMARY

This application provides a communication method and a communications apparatus, so as to resolve the following problem: How does a control plane function entity establish a session connection to a user plane function entity in an MBMS architecture with separation between function entities, to meet a service requirement of an application server?

According to a first aspect, this application provides a communication method. The method includes obtaining, by a control plane function entity, a correspondence between address information of a user plane function entity and a user plane capability supported by the user plane function entity. The method also includes receiving, by the control plane function entity, a request message sent by an application server, where the request message is used to request to establish a session for a first service, the request message includes service information of the first service, and the service information includes at least one of broadcast area information and service type information. The method also includes determining, by the control plane function entity, address information of a target user plane function entity based on the correspondence and the service information. The method also includes establishing, by the control plane function entity, a session connection to the target user plane function entity based on the address information of the target user plane function entity.

This aspect provides a relatively flexible method for connecting function entities. The control plane function entity pre-establishes the correspondence between the address information of the user plane function entity and the user plane capability, so that after receiving the request message sent by the application server, the control plane function entity can determine, based on the service information, for example, the broadcast area information or the service type information, in the request message, address information of a user plane function entity providing a service, and establish a session connection. Therefore, a user plane function entity is flexibly selected based on a service requirement of the first service, service limitations of an application server caused by a preconfigured manner in the current system are avoided, and service quality is improved.

With reference to the first aspect, in an implementation, the determining, by the control plane function entity, address information of a target user plane function entity based on the correspondence and the service information includes: determining, by the control plane function entity, a user plane capability of the target user plane function entity based on the service information; and searching, by the control plane function entity, the correspondence based on the determined user plane capability, to determine the address information of the target user plane function entity.

With reference to the first aspect, in an implementation, the control plane function entity includes at least one of a broadcast multicast service center (BM-SC) control plane function entity and a multimedia broadcast multicast system gateway MBMS-GW control plane function entity.

With reference to the first aspect, in an implementation, the control plane function entity includes a BM-SC control plane function entity and an MBMS-GW control plane function entity; the determining, by the control plane function entity, address information of a target user plane function entity based on the correspondence and the service information includes: determining, by the BM-SC control plane function entity, the address information of the target user plane function entity based on the correspondence and the service information; and the establishing, by the control plane function entity, a session connection to the target user plane function entity based on the address information of the target user plane function entity includes: sending, by the BM-SC control plane function entity, a session start request to the MBMS-GW control plane function entity, where the session start request includes the address information of the target user plane function entity; and establishing, by the MBMS-GW control plane function entity, a session connection to the target user plane function entity based on the address information of the target user plane function entity.

With reference to the first aspect, in an implementation, the control plane function entity is an MBMS-GW control plane function entity, and the receiving, by the control plane function entity, a request message sent by an application server includes: receiving, by the MBMS-GW control plane function entity by using a BM-SC control plane function entity, the request message sent by the application server.

With reference to the first aspect, in an implementation, the broadcast area information includes a cell identity (cell ID), a service area identifier (SAI), or geographical location information; and the service type information includes a mobile broadband MBB service, an Internet of Things (IoT) service, an ultra-reliable and low latency communications (URLLC) service, or an emergency call (MCPTT) service.

According to a second aspect, this application provides a communications apparatus. The apparatus is a control plane function entity, including: an obtaining unit, configured to obtain a correspondence between address information of a user plane function entity and a user plane capability supported by the user plane function entity; a transceiver unit, configured to receive a request message sent by an application server, where the request message is used to request to establish a session for a first service, the request message includes service information of the first service, and the service information includes at least one of broadcast area information and service type information; and a processing unit, configured to: determine address information of a target user plane function entity based on the correspondence obtained by the obtaining unit and the service information received by the transceiver unit, and establish a session connection to the target user plane function entity based on the address information of the target user plane function entity.

With reference to the second aspect, in an implementation, the processing unit is further configured to: determine a user plane capability of the target user plane function entity based on the service information; and search the correspondence based on the determined user plane capability, to determine the address information of the target user plane function entity.

With reference to the second aspect, in an implementation, the apparatus includes at least one of a broadcast multicast service center (BM-SC) control plane function entity and a multimedia broadcast multicast system gateway (MBMS-GW) control plane function entity.

With reference to the second aspect, in an implementation, the apparatus includes a BM-SC control plane function entity and an MBMS-GW control plane function entity, the processing unit includes a first processing unit and a second processing unit, the BM-SC control plane function entity includes the transceiver unit, the obtaining unit, and the first processing unit, and the MBMS-GW control plane function entity includes the second processing unit, where the first processing unit is configured to: determine the address information of the target user plane function entity based on the correspondence and the service information, and send a session start request to the MBMS-GW control plane function entity by using the transceiver unit, where the session start request includes the address information of the target user plane function entity; and the second processing unit is configured to establish a session connection to the target user plane function entity based on the address information of the target user plane function entity.

With reference to the second aspect, in an implementation, the apparatus includes a BM-SC control plane function entity and an MBMS-GW control plane function entity, and the BM-SC control plane function entity includes the transceiver unit, where the transceiver unit is configured to send the received request message to the MBMS-GW control plane function entity.

With reference to the second aspect, in an implementation, the broadcast area information includes a cell identity (cell ID), a service area identifier (SAI), or geographical location information; and the service type information includes a mobile broadband (MBB) service, an Internet of Things (IoT) service, an ultra-reliable and low latency communications URLLC service, or an emergency call (MCPTT) service.

According to a third aspect, this application further provides a communications interface, where the communications interface is configured to connect a user plane function entity and a control plane function entity, to implement a session connection between the user plane function entity and the control plane function entity.

According to a fourth aspect, this application further provides a communications system, including: an application server, a control plane function entity, and a target user plane function entity, where the control plane function entity is configured to send a session connection request to the target user plane function entity; the application server is configured to send a request message to the control plane function entity, where the request message is used to request to establish a session for a first service, the request message includes service information of the first service, and the service information includes at least one of broadcast area information and service type information; the control plane function entity is configured to: obtain a correspondence between address information of a user plane function entity and a user plane capability supported by the user plane function entity, and receive the request message sent by the application server; and the control plane function entity is further configured to: determine address information of the target user plane function entity based on the correspondence and the service information, and establish a session connection to the target user plane function entity based on the address information of the target user plane function entity.

With reference to the fourth aspect, in an implementation, the target user plane function entity is configured to: receive the session connection request sent by the control plane function entity, generate a session connection response based on the session connection request, and send the session connection response to the control plane function entity, to establish a session connection. In addition, the control plane function entity is further configured to implement any one of the first aspect or the implementations of the first aspect.

According to a fifth aspect, this application further provides a computer storage medium, configured to store a computer software instruction used for the foregoing communication method, and the computer software instruction includes a program designed to perform the foregoing aspects.

This application provides a communication method. The control plane function entity searches, based on the service information of the first service, the correspondence between the address information of the user plane function entity and the user plane capability supported by the user plane function entity, to determine the target user plane function entity; and establishes a session connection to the target user plane function entity, so as to provide a service for the first service. Therefore, a user plane function entity is flexibly selected based on a service requirement of the first service, service limitations of an application server caused by a preconfigured manner in the current system are avoided, and service quality is improved.

BRIEF DESCRIPTION OF THE DRAWINGS

To describe technical solutions of this application more clearly, the following briefly describes the accompanying drawings required for describing the embodiments.

DETAILED DESCRIPTION OF ILLUSTRATIVE EMBODIMENTS

Embodiments of this application may be applied to an MBMS architecture with separation between a control plane function entity and a user plane function entity, and further, the MBMS architecture may be applied to various communications systems, for example, an LTE system or other wireless communications systems using various radio access technologies.

To resolve the foregoing technical problem, this application provides the following embodiments. Each embodiment includes an application server (AS), a control plane function entity, and at least one user plane function entity. Each user plane function entity supports one or two user plane capabilities, and the user plane capability may be a broadcast area capability or a service type capability or the like supported by the user plane function entity. The application server is configured to initiate a request to the control plane function entity, so as to activate an MBMS bearer.

Figure 1:
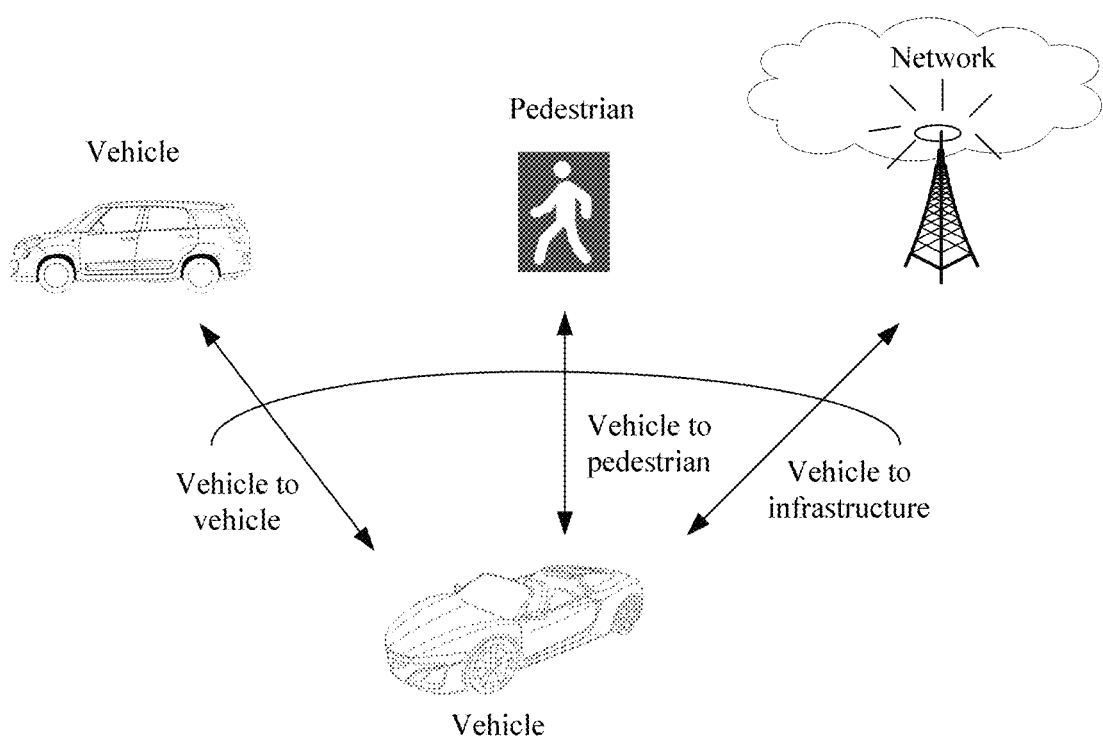
FIG. 1 is a schematic diagram of an application scenario of a V2X service according to this application.
Figure 2:
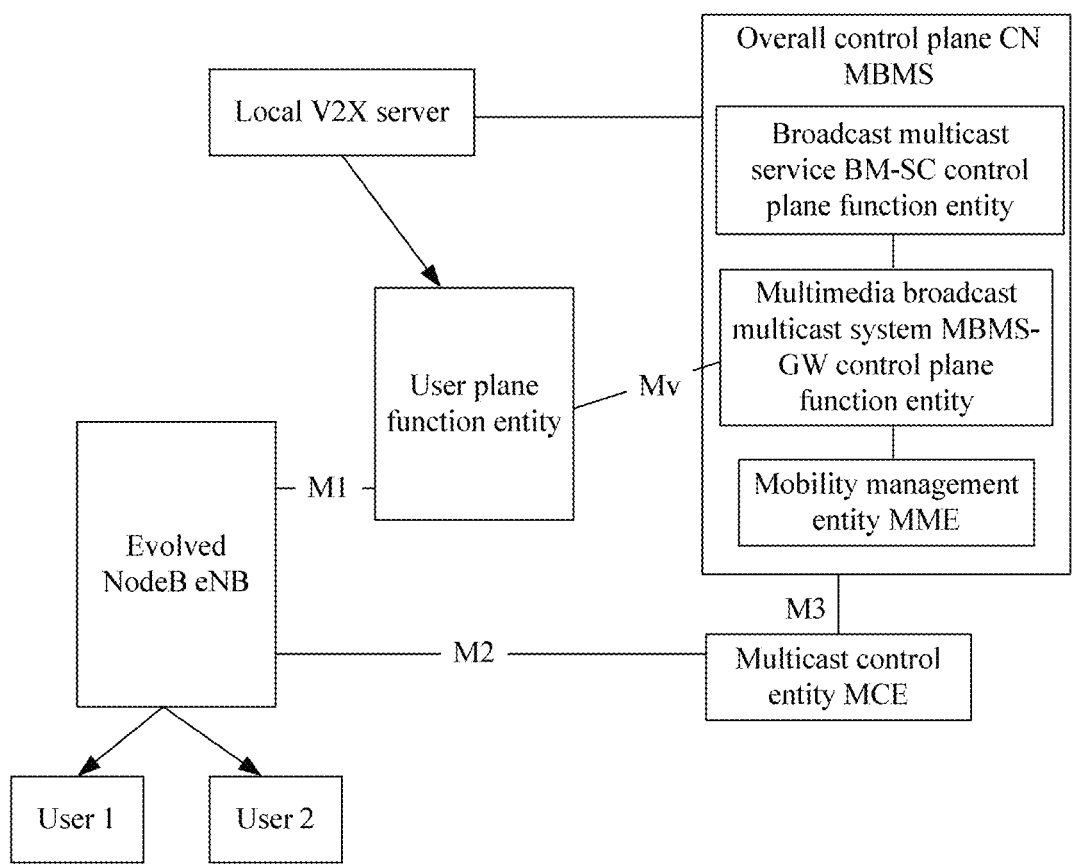
FIG. 2 is a schematic diagram of an MBMS architecture with separation between a control plane function entity and a user plane function entity according to this application.

FIG. 2 is a schematic diagram of an MBMS architecture with separation between a control plane function entity and a user plane function entity. As shown in FIG. 2, to reduce a transmission delay in a core network, the user plane function entity is disposed at a location relatively close to an evolved NodeB (eNB); the control plane function entity is disposed in an overall CN MBMS, and the overall MBMS includes at least one control plane function entity, for example, a BM-SC control plane function entity, an MBMS-GW control plane function entity, or an MCE (multicast control entity). In addition, the user plane function entity and the control plane function entity may be connected through a defined Mv interface.

It should be noted that, the user plane function entity and the control plane function entity mentioned in the embodiments of this application may be independent physical devices, or may be disposed on an existing physical device. This is not limited herein.

Embodiment 1

Figure 3:
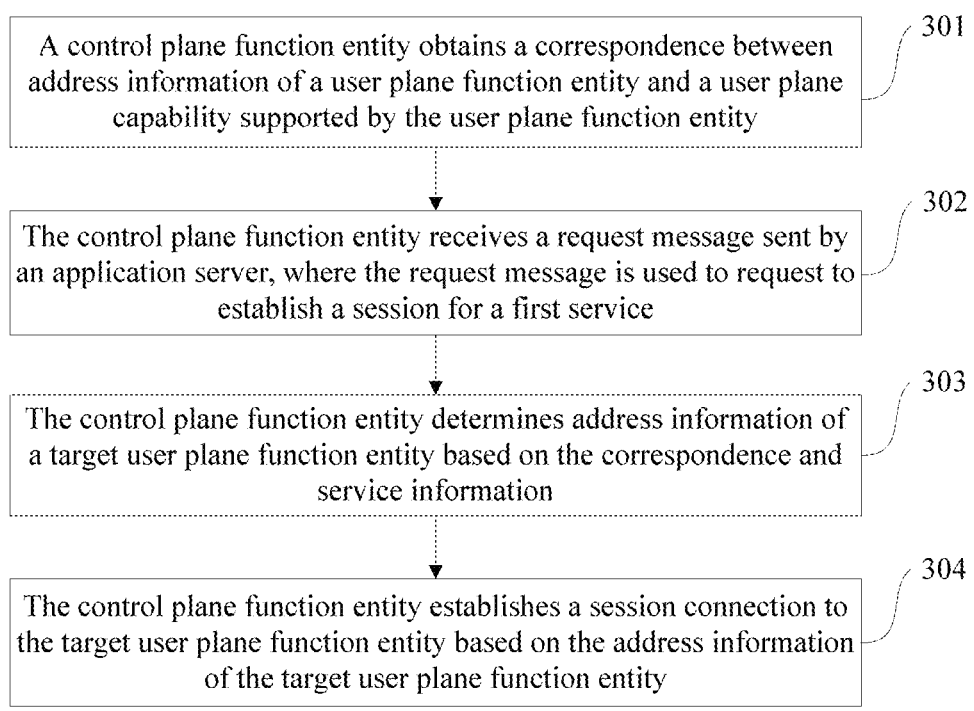
FIG. 3 is a schematic flowchart of a communication method according to this application.

This application discloses a communication method, used to provide, for an application server, a user plane function entity supporting a service requirement of the application server. As shown in FIG. 3, the method includes the following steps.

Step 301: A control plane function entity obtains a correspondence between address information of a user plane function entity and a user plane capability supported by the user plane function entity.

The control plane function entity includes at least one of a BM-SC control plane function entity and an MBMS-GW control plane function entity.

The address information includes an IP address or an FQDN (fully qualified domain name) or the like of the user plane function entity, and is used to identify the user plane function entity.

The user plane capability supported by the user plane function entity includes a supported broadcast area, a supported service type, and the like.

Specifically, broadcast area information may be used to indicate a coverage capability of the user plane function entity, namely, a range of service that can be provided by the user plane function entity, and may include a cell identity (cell ID), a service area identifier (SAI), or geographical location information. The cell identity is used to identify a cell, the service area identifier is used to identify a service area, and the geographical location information may be coordinate information. This is not limited.

In addition, service type information may include a mobile broadband (MBB) service, an Internet of Things IoT service, an ultra-reliable and low latency communications (URLLC) service, or a mission-critical push-to-talk (MCPTT) service.

Optionally, in step 301, that the control plane function entity obtains the correspondence is specifically implemented in the following manners.

Manner 1: The control plane function entity receives the correspondence sent by the user plane function entity.

Manner 2: The control plane function entity obtains the address information of the user plane function entity and the user plane capability supported by the user plane function entity that are sent by the user plane function entity, and establishes a correspondence between the address information of the user plane function entity and the user plane capability supported by the user plane function entity.

Manner 3: The control plane function entity receives the user plane capability supported by the user plane function entity and an identifier of the user plane function entity that are sent by the user plane function entity; and obtains the address information of the user plane function entity based on the received identifier, so as to establish the correspondence. An address of the user plane function entity may be obtained by using a DNS (domain name system) server, and details are not described.

Specifically, the foregoing correspondence includes a correspondence between address information of each user plane function entity in an MBMS system and a user plane capability supported by each user plane function entity. For example, each IP address or FQDN corresponds to a user plane capability supported by one user plane function entity.

Step 302: The control plane function entity receives a request message sent by an application server, where the request message is used to request to establish a session for a first service, the request message includes service information of the first service, and the service information includes at least one of broadcast area information and service type information.

The request message is used to initiate a session connection between the control plane function entity and the user plane function entity, so as to provide a service for the application server. The request message may further include information such as a TMGI (temporary group identity) and QoS (quality of service).

Step 303: The control plane function entity determines address information of a target user plane function entity based on the correspondence and the service information.

Specifically, the control plane function entity determines, based on the at least one of the broadcast area information and the service type information in the service information, a user plane capability supported by the target user plane function entity; and then searches the correspondence based on the determined user plane capability, to determine the address information of the target user plane function entity.

Example 1

It is assumed that the service information of the first service carries the broadcast area information, and the broadcast area information is used to indicate a service range of the first service. After receiving the service information, the control plane function entity determines a broadcast area of the target user plane function entity based on the broadcast area information. The service range of the first service may be a range in which the first service can be provided; and the broadcast area of the target user plane function entity may be a range in which the target user plane function entity can provide a service. It should be noted that, a coverage range of the target user plane function entity overlaps the service range of the first service. In other words, the coverage range of the target user plane function entity includes a part or all of the service range of the first service.

Specifically, if the service range of the first service is included within a coverage capability of a first user plane function entity, the target user plane function entity is the first user plane function entity; if the service range of the first service needs to be covered by capabilities of at least two user plane function entities, the target user plane function entity is the at least two user plane function entities.

Further, the control plane function entity searches the foregoing correspondence based on the coverage capability of the determined target user plane function entity, to obtain an address of the target user plane function entity.

Example 2

It is assumed that the service information of the first service carries the service type information. For example, a service type of the first service is an MBB service. The control plane function entity determines that the target user plane function entity supports an MBB service capability, searches for, based on the correspondence, a user plane function entity supporting the MBB service capability, and uses the user plane function entity as the target user plane function entity. An address, for example, an IP address or an FQDN, of the user plane function entity is sent to the control plane function entity. Optionally, if at least two user plane function entities support the MBB service capability, the control plane function entity determines to use the at least two user plane function entities supporting the MBB service capability as target user plane function entities, and provides a session connection service.

Example 3

The service information of the first service includes the broadcast area information and the service type information, and the broadcast area information is used to indicate the service range of the first service. After receiving the service information, the control plane function entity searches, with reference to Example 1 and Example 2, the correspondence for a user plane function entity that supports the service range of the first service and the service type of the first service, to obtain an address of the user plane function entity found. The user plane function entity found is the target user plane function entity.

Step 304: The control plane function entity establishes a session connection to the target user plane function entity based on the address information of the target user plane function entity.

Specifically, the control plane function entity sends a session start request message to the target user plane function entity, where a destination address of the message is the address of the target user plane function entity; and after receiving the session start request message, the target user plane function entity feeds back a session start response message to the control plane function entity, indicating that establishment of a session connection is allowed.

This embodiment provides a communication method. The control plane function entity searches, based on the service information of the first service, the correspondence between the address information of the user plane function entity and the user plane capability supported by the user plane function entity, to determine the target user plane function entity; and establishes a session connection to the target user plane function entity, so as to provide a service for the first service. Therefore, a user plane function entity is flexibly selected based on a service requirement of the first service, service limitations of an application server caused by a preconfigured manner in the current system are avoided, and service quality is improved.

Embodiment 2

Figure 4:
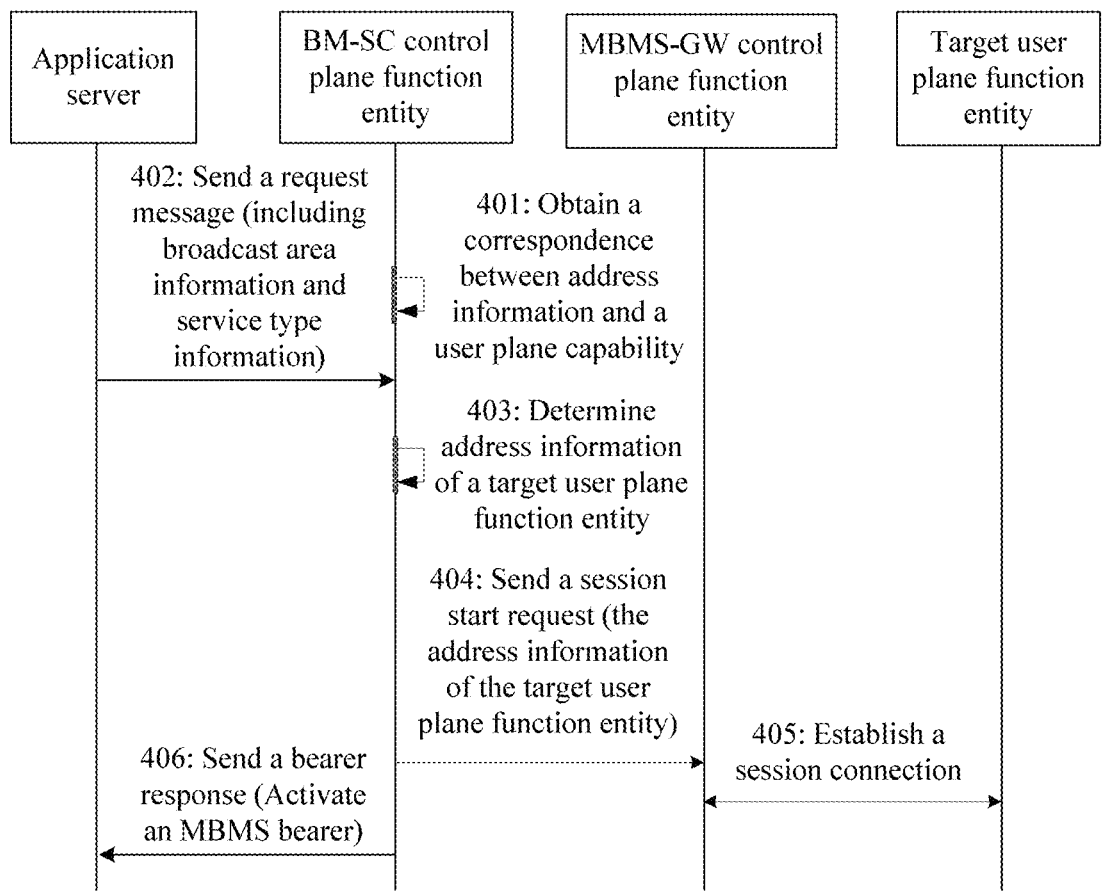
FIG. 4 is a signaling flowchart of a communication method according to this application.

As shown in FIG. 4, this application provides another communication method. The method is performed by a control plane function entity. The control plane function entity includes a BM-SC control plane function entity and an MBMS-GW control plane function entity. Specific steps of the method are as follows.

Step 401: The BM-SC control plane function entity obtains a correspondence between address information of a user plane function entity and a user plane capability supported by the user plane function entity.

Step 401 may be specifically implemented in the manners described in step 301. In addition, for the address information and the user plane capability, refer to the related descriptions of the embodiment shown in FIG. 3, and details are not described again.

Step 402: The BM-SC control plane function entity receives a request message sent by an application server.

The request message is used to request to establish a session for a first service, the request message includes service information of the first service, and the service information includes at least one of broadcast area information and service type information.

For the broadcast area information and the service type information, refer to the related descriptions of the embodiment shown in FIG. 3, and details are not described again.

Step 403: The BM-SC control plane function entity determines address information of a target user plane function entity based on the correspondence and service information.

Step 403 may be specifically implemented with reference to the related descriptions of step 303, and details are not described again.

Step 404: The BM-SC control plane function entity sends a session start request to the MBMS-GW control plane function entity, where the session start request includes the address information of the target user plane function entity.

The address information of the target user plane function entity may be information such as an IP address or an FQDN of the target user plane function entity.

Step 405: The MBMS-GW control plane function entity receives the session start request, and establishes a session connection to the target user plane function entity based on the address information of the target user plane function entity.

Specifically, after receiving the session start request sent by the BM-SC control plane function entity, the MBMS-GW control plane function entity feeds back a session start response to the BM-SC control plane function entity, where the session start response is used to indicate that the MBMS-GW control plane function entity has received the address information of the target user plane function entity. The MBMS-GW control plane function entity sends a connection request message to the target user plane function entity, where a destination address of the connection request message is an address of the target user plane function entity. The target user plane function entity receives the connection request message, and feeds back a response message to the MBMS-GW control plane function entity, where the response message is used to indicate that a connection is allowed and a service is allowed to be provided.

The session start response further includes information used to indicate that the MBMS-GW control plane function entity successfully establishes a session connection to the target user plane function entity.

Optionally, the foregoing method further includes step 406. The BM-SC control plane function entity sends a bearer response used to activate an MBMS bearer to the application server, so that the target user plane function entity provides a service for the application server.

Further, the BM-SC control plane function entity is connected to the target user plane function entity through an My port.

In the communication method provided in this embodiment, the control plane function entity includes the BM-SC control plane function entity and the MBMS-GW control plane function entity; the BM-SC control plane function entity receives the request message and searches for a target user plane function entity that can provide the first service, and then the MBMS-GW control plane function entity establishes a session connection to the target user plane function entity. In this way, the control plane function entity flexibly selects, based on the service information sent by the application server, a user plane function entity providing the first service, and failure to meet a requirement of the first service of the application server caused by using a preconfigured user plane function entity in the current system is avoided.

Embodiment 3

Figure 5:
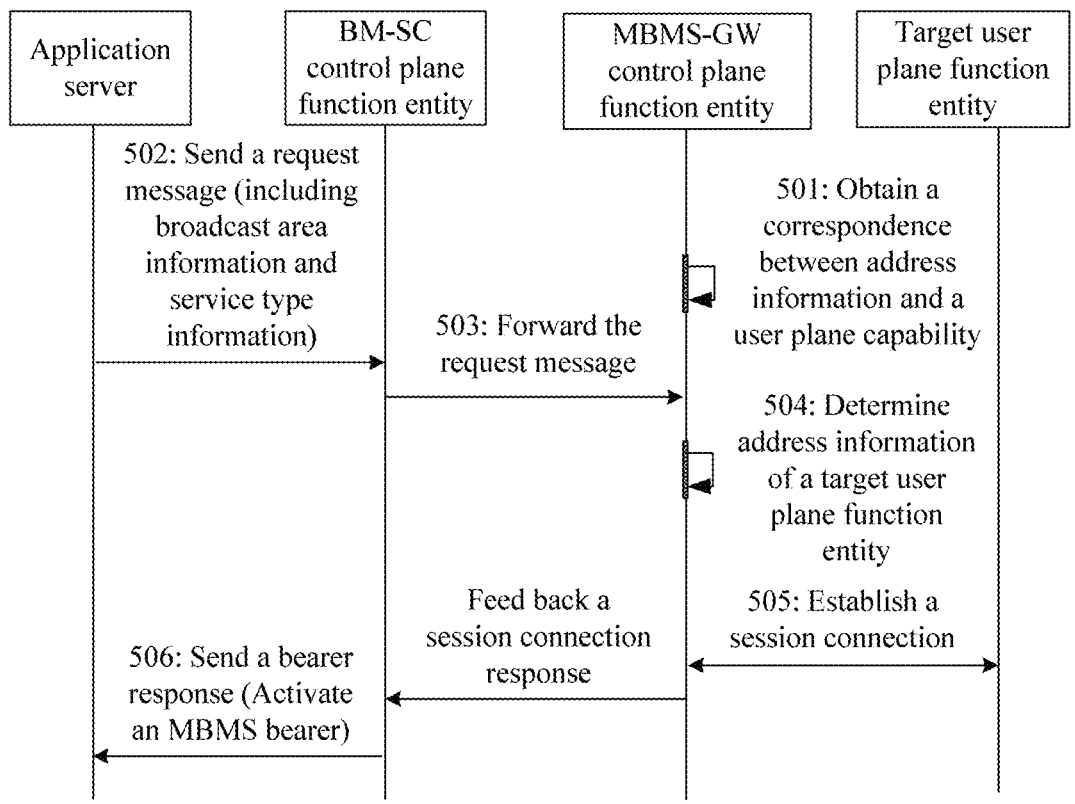
FIG. 5 is a signaling flowchart of another communication method according to this application.

As shown in FIG. 5, this application provides another communication method. The method is performed by a control plane function entity. The control plane function entity includes a BM-SC control plane function entity and an MBMS-GW control plane function entity. Specific steps of the method are as follows.

Step 501: The MBMS-GW control plane function entity obtains a correspondence between address information of a user plane function entity and a user plane capability supported by the user plane function entity.

Step 502: The BM-SC control plane function entity receives a request message sent by an application server, where the request message is used to request to establish a session for a first service, the request message includes service information of the first service, and the service information includes at least one of broadcast area information and service type information.

Step 503: The BM-SC control plane function entity forwards the request message to the MBMS-GW control plane function entity.

Step 504: The MBMS-GW control plane function entity receives the request message sent by the BM-SC control plane function entity, and determines address information of a target user plane function entity based on the service information in the request message and the correspondence.

Step 505: The MBMS-GW control plane function entity establishes a session connection to the target user plane function entity based on the address information.

The method provided in this embodiment further includes: feeding back, by the MBMS-GW control plane function entity, a session connection response to the BM-SC control plane function entity, to notify the BM-SC control plane function entity that a session is established successfully.

Step 506: After receiving a session connection response, the BM-SC control plane function entity sends a bearer response to the application server.

It should be noted that, for both a noun and an implementation of a step in the embodiment shown in FIG. 5, refer to the related descriptions of the embodiment shown in FIG. 3, and details are not described again.

Figure 6:
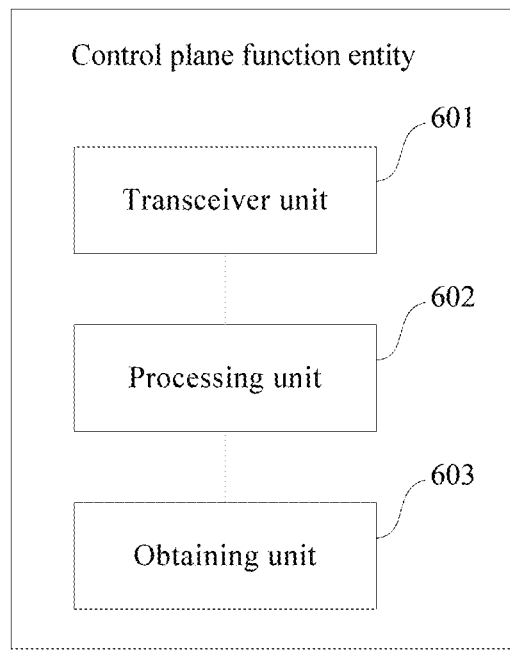
FIG. 6 is a schematic structural diagram of a control plane function entity according to this application.

As shown in FIG. 6, this application provides a communications apparatus. The apparatus is a control plane function entity. The apparatus may be configured to perform steps performed by the control plane function entity shown in FIG. 3, or may be configured to perform actions performed by both the BM-SC control plane function entity and the MBMS-GW control plane function entity in the embodiment shown in FIG. 4 or FIG. 5.

The apparatus includes a transceiver unit 601, a processing unit 602, and an obtaining unit 603.

The obtaining unit 603 is configured to obtain a correspondence between address information of a user plane function entity and a user plane capability supported by the user plane function entity.

The user plane capability includes at least one of a broadcast area and a service type.

The processing unit 602 may be implemented in the manners provided in step 301 in the embodiment shown in FIG. 3, and details are not described again.

The transceiver unit 601 is configured to receive a request message sent by an application server.

The request message is used to request to establish a session for a first service, the request message includes service information of the first service, and the service information includes at least one of broadcast area information and service type information.

The broadcast area information includes a cell identity (cell ID), a service area identifier (SAI), or geographical location information, and the service type information includes an MBB service, an IoT service, a URLLC service, an MCPTT service, or the like.

The processing unit 602 is further configured to: determine address information of a target user plane function entity based on the correspondence obtained by the obtaining unit 603 and the service information received by the transceiver unit 601; and establish a session connection to the target user plane function entity based on the address information of the target user plane function entity.

Further, the processing unit 602 is further configured to: determine a user plane capability of the target user plane function entity based on the service information; and search the correspondence based on the determined user plane capability, to determine the address information of the target user plane function entity.

Optionally, the foregoing apparatus includes at least one of a BM-SC control plane function entity and an MBMS-GW control plane function entity.

Figure 7:
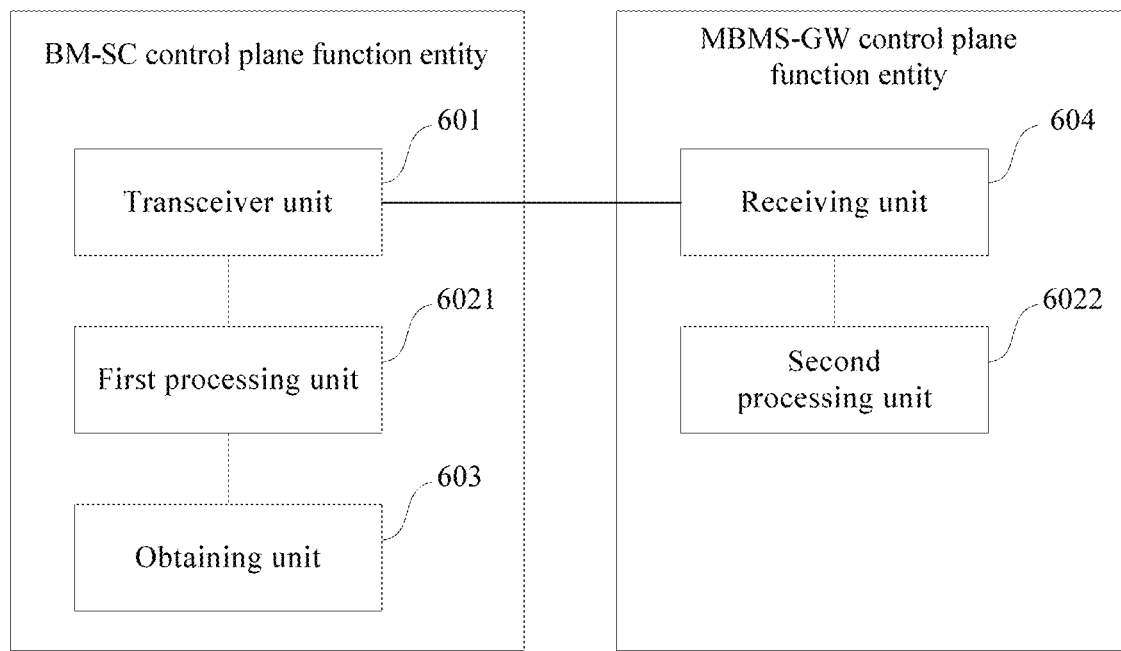
FIG. 7 is a schematic structural diagram of another control plane function entity according to this application.

In a possible implementation, as shown in FIG. 7, both the transceiver unit 601 and the obtaining unit 603 are located in the BM-SC control plane function entity. The processing unit 602 includes a first processing unit 6021 and a second processing unit 6022, where the first processing unit 6021 is located in the BM-SC control plane function entity, and the second processing unit 6022 is located in the MBMS-GW control plane function entity.

In addition, the foregoing apparatus further includes a receiving unit 604, where the receiving unit 604 is located in the MBMS-GW control plane function entity.

The first processing unit 6021 is specifically configured to: determine the address information of the target user plane function entity based on the correspondence and the service information; and send a session start request to the MBMS-GW control plane function entity, where the session start request includes the address information of the target user plane function entity.

The receiving unit 604 is configured to receive the session start request sent by the first processing unit 6021.

The second processing unit 6022 is configured to establish a session connection to the target user plane function entity based on the address information of the target user plane function entity that is carried in the session start request received by the receiving unit 604.

In another possible implementation, the transceiver unit 601 is located in the BM-SC control plane function entity, the obtaining unit 603 may be located in the BM-SC control plane function entity or the MBMS-GW control plane function entity, and the processing unit 602 is located in the MBMS-GW control plane function entity.

The transceiver unit 601 is configured to receive the request message sent by the application server, and send the request message to the MBMS-GW control plane function entity.

Optionally, the transceiver unit 601 is further configured to send a bearer response used to activate an MBMS bearer to the application server, so that the target user plane function entity provides a service for the application server.

Optionally, the foregoing apparatus may further include a storage unit, configured to store information such as the address information of the target user plane function entity, the service information of the first service in the request message, and the correspondence.

It should be noted that, for a noun or a terminology in the embodiment shown in FIG. 6 or FIG. 7, refer to the related descriptions of the embodiment shown in FIG. 3, and details are not described again.

The control plane function entity provided in this embodiment flexibly selects, based on the broadcast area information or the service type information that is provided by the application server, a proper user plane function entity to provide a service, so that flexibility in configuring a user plane function entity is improved, the user plane function entity can meet a service requirement of the application server, and service quality is improved.

In addition, this application further provides a user plane function entity. A user plane capability supported by the user plane function entity may include a broadcast area or a service type. For details, refer to the related descriptions of the embodiment shown in FIG. 3, and details are not described again.

The user plane function entity includes a transceiver unit and a processing unit.

The transceiver unit is configured to obtain a session connection request sent by a control plane function entity. The processing unit is configured to: generate a session connection response based on the received session connection request, and send the session connection response to the control plane function entity by using the transceiver unit, so that the transceiver unit establishes a session connection to the control plane function entity.

This application further provides a control plane function entity, configured to receive a request message sent by an application server, search for a target user plane function entity, and establish a session connection to the target user plane function entity. The control plane function entity may be configured to perform actions performed by the control plane function entity in the foregoing method embodiments.

Figure 8:
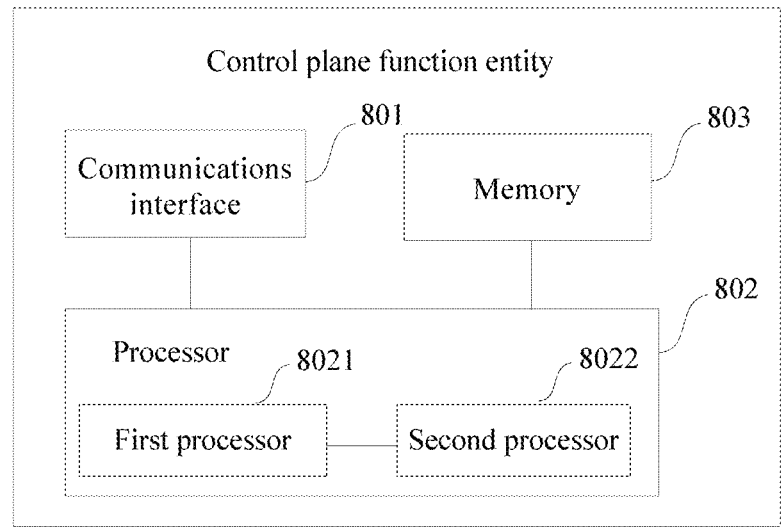
FIG. 8 is a schematic structural diagram of still another control plane function entity according to this application.

As shown in FIG. 8, this application provides a communications apparatus. The apparatus is a control plane function entity. The control plane function entity may include at least one of a BM-SC control plane function entity and an MBMS-GW control plane function entity. The control plane function entity may be configured to perform actions performed by the control plane function entity or by the BM-SC control plane function entity and the MBMS-GW control plane function entity in the foregoing method embodiments.

Specifically, the control plane function entity includes a communications interface 801, a processor 802, and a memory 803. The control plane function entity may also include more or less components, or some components may be combined, or different component arrangements are used. This is not limited in this application.

The communications interface 801 may include at least one communications interface configured to connect a user plane function entity and a control plane function entity, for example, an My interface and an Mu interface. The Mv interface is configured to connect an MBMS-GW control plane function entity and an MBMS-GW user plane function entity; and the Mu interface is configured to connect a BM-SC control plane function entity and a BM-SC user plane function entity. The communications interface 801 may further include a communications interface configured to connect to an application server.

The memory 803 stores a program or code. The memory 803 may include a volatile memory, for example, a random access memory (RAM), or may include a non-volatile memory, for example, a flash memory, a hard disk drive (HDD) or a solid-state drive (SSD). Alternatively, the memory 803 may include a combination of the foregoing types of memories.

The processor 802 is a control center of the control plane function entity, and connects parts of the entire control plane function entity through various interfaces and lines. The processor 802 may implement a function in any embodiment shown in FIG. 3 to FIG. 5 by executing the program or the code in the memory 803.

The processor 802 may be formed by an integrated circuit (IC), for example, may be formed by a single packaged IC, or may be formed by connecting a plurality of packaged ICs having a same function or different functions. For example, the processor may include only a central processing unit (CPU), or may be a combination of a GPU, a digital signal processor (DSP), and a control chip (such as a baseband chip). In the implementations of this application, the CPU may be a single computing core, or may include a plurality of computing cores.

Optionally, the processor 802 includes at least one processor, for example, may include a first processor 8021 and a second processor 8022. The first processor 8021 is located in the BM-SC control plane function entity, and the second processor 8022 is located in the MBMS-GW control plane function entity.

Further, optionally, the memory 803 includes a first memory 8031 and a second memory 8032. The first memory 8031 may be located in the BM-SC control plane function entity, and is configured to store a program or code used to perform a function of the BM-SC control plane function entity; and the second memory 8032 may be located in the MBMS-GW control plane function entity, and is configured to store a program or code used to perform a function of the MBMS-GW control plane function entity.

Correspondingly, the first processor 8021 is configured to execute the program or the code in the first memory 8031, and the second processor 8022 is configured to execute the program or the code in the second memory 8032, to implement functions of the BM-SC control plane function entity and the MBMS-GW control plane function entity in any embodiment shown in FIG. 3 to FIG. 5.

This application further provides a communications system. The system is configured to implement the communication methods described in the foregoing embodiments. Further, the system includes: an application server, a control plane function entity, and a target user plane function entity.

The application server is configured to send a request message to the control plane function entity, where the request message is used to request to establish a session for a first service, the request message includes service information of the first service, and the service information includes at least one of broadcast area information and service type information.

The control plane function entity is configured to: obtain a correspondence between address information of a user plane function entity and a user plane capability supported by the user plane function entity, and receive the request message sent by the application server.

The control plane function entity is further configured to: determine address information of the target user plane function entity based on the correspondence and the service information, and establish a session connection to the target user plane function entity based on the address information of the target user plane function entity.

The control plane function entity is further configured to send a session connection request to the target user plane function entity. The target user plane function entity is configured to: receive the session connection request sent by the control plane function entity, generate a session connection response based on the session connection request, and send the session connection response to the control plane function entity.

It should be noted that, the control plane function entity may be the control plane function entity shown in FIG. 6, FIG. 7, or FIG. 8, and details are not described again.

This application further provides a computer storage medium, where the computer storage medium may store a program. When the program is executed, some or all of the steps in the embodiments of the communication method provided in this application may be included. The storage medium may be a magnetic disk, an optical disc, a read-only memory (ROM), a random access memory (RAM), or the like.

A person skilled in the art may clearly understand that, the technologies in the embodiments of the present application may be implemented by software in addition to a necessary general hardware platform. Based on such an understanding, the technical solutions of the present application essentially or the part contributing to the prior art may be implemented in a form of a software product. The computer software product may be stored in a storage medium, such as a ROM/RAM, a magnetic disk, or an optical disc, and include instructions for instructing a computer device (which may be a personal computer, a server, a network device, or the like) to perform the methods described in the embodiments or some parts of the embodiments of the present application.

Same and similar parts between the embodiments in this specification may be mutually referenced. Especially, wireless communications device embodiments are basically similar to the method embodiments, and therefore are described briefly; for related parts, refer to descriptions in the method embodiments.

The implementations of the present application that are described above are not intended to limit the protection scope of the present application.

What is claimed is:

1. A method, comprising:
obtaining, by a control plane function entity, a correspondence between address information of one or more user plane function entities and user plane capabilities supported by the one or more user plane function entities;
receiving, by the control plane function entity, a request message from an application server, wherein the request message requests to establish a session for a first service, the request message comprises service information of the first service, and the service information comprises broadcast area information of the first service or service type information of the first service;
determining, by the control plane function entity, address information of a target user plane function entity based on the correspondence and the service information, wherein determining, by the control plane function entity, the address information of the target user plane function entity based on the correspondence and the service information comprises:
determining, by the control plane function entity, a user plane capability of the target user plane function entity based on the service information; and
searching, by the control plane function entity, the correspondence based on the determined user plane capability of the target user plane function entity, to determine the address information of the target user plane function entity; and
establishing, by the control plane function entity, a session connection to the target user plane function entity based on the address information of the target user plane function entity.

2. The method according to claim 1, wherein the control plane function entity comprises a broadcast multicast service center (BM-SC) control plane function entity or a multimedia broadcast multicast system gateway (MBMS-GW) control plane function entity.

3. The method according to claim 1, wherein:
the control plane function entity comprises a broadcast multicast service center (BM-SC) control plane function entity and a multimedia broadcast multicast system gateway (MBMS-GW)control plane function entity;
determining, by the control plane function entity, the address information of the target user plane function entity based on the correspondence and the service information comprises:
determining, by the BM-SC control plane function entity, the address information of the target user plane function entity based on the correspondence and the service information; and
establishing, by the control plane function entity, the session connection to the target user plane function entity based on the address information of the target user plane function entity comprises:
sending, by the BM-SC control plane function entity, a session start request to the MBMS-GW control plane function entity, wherein the session start request comprises the address information of the target user plane function entity; and
establishing, by the MBMS-GW control plane function entity, a session connection to the target user plane function entity based on the address information of the target user plane function entity.

4. The method according to claim 1, wherein the control plane function entity is a multimedia broadcast multicast system gateway (MBMS-GW) control plane function entity, and receiving, by the control plane function entity, the request message from the application server comprises:
receiving, by the MBMS-GW control plane function entity using a broadcast multicast service center (BM-SC) control plane function entity, the request message from the application server.

5. The method according to claim 1, wherein
the broadcast area information of the first service comprises a cell identity (cell ID), a service area identifier (SAT), or geographical location information; and
the service type information of the first service comprises a mobile broadband (MBB) service, an Internet of Things (IoT) service, an ultra-reliable and low latency communications (URLLC) service, or a mission-critical push-to-talk (MCPTT) service.

6. An apparatus, comprising:
at least one processor coupled with a non-transitory storage medium storing executable instructions; wherein the executable instructions, when executed by the at least one processor, cause the at least one processor to:
obtain a correspondence between address information of one or more user plane function entities and user plane capabilities supported by the one or more user plane function entities;
receive a request message from an application server, wherein the request message requests to establish a session for a first service, the request message comprises service information of the first service, and the service information comprises broadcast area information of the first service or service type information of the first service;
determine address information of a target user plane function entity based on the correspondence and the service information, wherein determining the address information of the target user plane function entity based on the correspondence and the service information comprises:
determining a user plane capability of the target user plane function entity based on the service information; and
searching the correspondence based on the determined user plane capability of the target user plane function entity, to determine the address information of the target user plane function entity; and
establish a session connection to the target user plane function entity based on the address information of the target user plane function entity.

7. The apparatus according to claim 6, wherein the apparatus implements a broadcast multicast service center (BM-SC) control plane function entity or a multimedia broadcast multicast system gateway (MBMS-GW) control plane function entity.

8. The apparatus according to claim$_7$, wherein:
the apparatus implements a broadcast multicast service center (BM-SC) control plane function entity and a multimedia broadcast multicast system gateway (MBMS-GW) control plane function entity, the at least one processor comprises a first processor and a second processor, the BM-SC control plane function entity is implemented by the first processor, and the MBMS-GW control plane function entity is implemented by the second processor;
the first processor is configured to: determine the address information of the target user plane function entity based on the correspondence and the service information, and send a session start request to the MBMS-GW control plane function entity, wherein the session start request comprises the address information of the target user plane function entity; and
the second processor is configured to establish a session connection to the target user plane function entity based on the address information of the target user plane function entity.

9. The apparatus according to claim 6, wherein the apparatus implements a multimedia broadcast multicast system gateway (MBMS-GW) control plane function entity, and the at least one processor is configured to receive a request message from an application server using a broadcast multicast service center (BM-SC) control plane function entity.

10. The apparatus according to claim 6, wherein:
the broadcast area information of the first service comprises a cell identity (cell ID), a service area identifier (SAT), or geographical location information; and
the service type information of the first service comprises a mobile broadband (MBB) service, an Internet of Things (IoT) service, an ultra-reliable and low latency communications (URLLC) service, or a mission-critical push-to-talk (MCPTT) service.

11. A system, comprising:
an application server;
a control plane function entity; and
a target user plane function entity;
wherein:
the application server is configured to send a request message to the control plane function entity, wherein the request message requests to establish a session for a first service, the request message comprises service information of the first service, and the service information comprises broadcast area information of the first service or service type information of the first service;

the control plane function entity is configured to:
obtain a correspondence between address information of one or more user plane function entities and user plane capabilities supported by the one or more user plane function entities, and receive the request message from the application server; and determine address information of the target user plane function entity based on the correspondence and the service information, wherein determining the address information of the target user plane function entity based on the correspondence and the service information comprises:
determining a user plane capability of the target user plane function entity based on the service information; and
searching the correspondence based on the determined user plane capability of the target user plane function entity, to determine the address information of the target user plane function entity; and establish a session connection to the target user plane function entity based on the address information of the target user plane function entity.

12. The system according to claim 11, wherein:
the control plane function entity is configured to send a session connection request to the target user plane function entity; and
the target user plane function entity is configured to: receive the session connection request from the control plane function entity, generate a session connection response based on the session connection request, and send the session connection response to the control plane function entity.

13. The system according to claim 11, wherein the control plane function entity comprises at a broadcast multicast service center (BM-SC) control plane function entity or a multimedia broadcast multicast system gateway (MBMS-GW) control plane function entity.

14. The system according to claim 11, wherein:
the control plane function entity comprises a broadcast multicast service center (BM-SC) control plane function entity and a multimedia broadcast multicast system gateway (MBMS-GW) control plane function entity;
the BM-SC control plane function entity is configured to determine the address information of the target user plane function entity based on the correspondence and the service information, and send a session start request to the MBMS-GW control plane function entity, wherein the session start request comprises the address information of the target user plane function entity; and
the MBMS-GW control plane function entity is configured to establish a session connection to the target user plane function entity based on the address information of the target user plane function entity.

15. The system according to claim 11, wherein:
the control plane function entity is a multimedia broadcast multicast system gateway (MBMS-GW) control plane function entity; and
the MBMS-GW control plane function entity is configured to receive, using a broadcast multicast service center (BM-SC) control plane function entity, the request message from the application server.

16. The system according to claim 11, wherein:
the broadcast area information of the first service comprises a cell identity (cell ID), a service area identifier (SAT), or geographical location information; and
the service type information of the first service comprises a mobile broadband (MBB) service, an Internet of Things (IoT) service, an ultra-reliable and low latency communications (URLLC) service, or a mission-critical push-to-talk (MCPTT) service.

* * * * *

UNITED STATES PATENT AND TRADEMARK OFFICE
CERTIFICATE OF CORRECTION

PATENT NO. : 11,019,463 B2
APPLICATION NO. : 16/423604
DATED : May 25, 2021
INVENTOR(S) : Deng et al.

Page 1 of 1

It is certified that error appears in the above-identified patent and that said Letters Patent is hereby corrected as shown below:

In the Claims

In Claim 5, Column 15; Line 42 delete "(SAT)" insert --(SAI)--
In Claim 10, Column 16; Line 52 delete "(SAT)" insert --(SAI)--
In Claim 16, Column 18; Line 32 delete "(SAT)" insert --(SAI)--

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*